United States Patent
Ragonetti et al.

(10) Patent No.: US 7,513,220 B2
(45) Date of Patent: Apr. 7, 2009

(54) WHIRLING WHEEL TOY

(75) Inventors: Peter T. Ragonetti, Brooklyn, NY (US); Jonathan Willinger, Tenafly, NJ (US); Ryan Rutherford, Rutherford, NJ (US)

(73) Assignee: J.W. Pet Company, Inc., Teterboro, NJ (US)

( * ) Notice: Subject to any disclaimer, the term of this patent is extended or adjusted under 35 U.S.C. 154(b) by 18 days.

(21) Appl. No.: 11/356,312

(22) Filed: Feb. 16, 2006

(65) Prior Publication Data
US 2006/0194504 A1    Aug. 31, 2006

Related U.S. Application Data

(63) Continuation of application No. 29/236,653, filed on Aug. 19, 2005, now Pat. No. Des. 526,029.

(60) Provisional application No. 60/653,385, filed on Feb. 16, 2005.

(51) Int. Cl.
*A01K 29/00* (2006.01)
(52) U.S. Cl. .......................... 119/707; 446/47
(58) Field of Classification Search ................ 119/707, 119/702; 446/46, 47
See application file for complete search history.

(56) References Cited

U.S. PATENT DOCUMENTS

| | | | |
|---|---|---|---|
| D165,649 S | 1/1952 | Harrison | |
| 2,835,073 A | 5/1958 | Dame | |
| 3,315,640 A * | 4/1967 | Gamble | 119/707 |
| 3,710,503 A * | 1/1973 | Rylands | 446/489 |
| 3,716,229 A * | 2/1973 | Van Der Cleyen et al. | 482/77 |
| 4,248,010 A * | 2/1981 | Fox | 446/47 |
| 4,370,824 A | 2/1983 | Resnicow | |
| 4,869,699 A * | 9/1989 | Plambeck et al. | 446/47 |
| 4,919,083 A * | 4/1990 | Axelrod | 119/710 |
| 5,045,011 A | 9/1991 | Lovik | |
| 5,297,799 A * | 3/1994 | Slater et al. | 473/573 |
| 5,360,363 A * | 11/1994 | Levin | 446/46 |
| D362,470 S * | 9/1995 | Smith | D21/443 |
| 5,536,195 A * | 7/1996 | Stamos | 446/48 |
| 5,553,570 A | 9/1996 | VanNatter et al. | |
| D386,223 S | 11/1997 | Imai | |
| D387,513 S * | 12/1997 | Mauldin, Jr. | D30/160 |
| D388,559 S | 12/1997 | Mauldin | |
| D393,110 S * | 3/1998 | Mauldin, Jr. | D30/160 |
| 5,799,616 A | 9/1998 | McClung | |
| 5,809,938 A * | 9/1998 | Baiera et al. | 119/707 |
| 5,813,366 A | 9/1998 | Mauldin | |
| D405,563 S * | 2/1999 | Baiera et al. | D30/160 |
| D412,768 S * | 8/1999 | Huettner et al. | D30/160 |
| 5,984,753 A * | 11/1999 | Perez | 446/46 |
| 6,073,588 A * | 6/2000 | McClung et al. | 119/709 |
| 6,228,001 B1 * | 5/2001 | Johnson et al. | 482/48 |
| 6,231,414 B1 * | 5/2001 | Ho | 446/15 |
| 6,527,608 B2 | 3/2003 | Calco | |

(Continued)

*Primary Examiner*—Yvonne R. Abbott
(74) *Attorney, Agent, or Firm*—Katten Muchin Rosenman LLP

(57) ABSTRACT

A throwable pet toy bounces and creates an interest for a pet when impacting the ground or an object. The toy includes two domed structures, which are mounted on opposite sides of an aerodynamic base. The structures are in fluid communication with each other. A fascinator is mounted in one of the first and second domed structure to produce an interest for a pet when one of the domed structures impacts.

20 Claims, 4 Drawing Sheets

U.S. PATENT DOCUMENTS

| | | | |
|---|---|---|---|
| 6,935,274 B1 * | 8/2005 | Rothschild | 119/702 |
| 6,981,471 B1 * | 1/2006 | Dubinins et al. | 119/710 |
| D518,546 S * | 4/2006 | Chiang | D21/801 |
| 7,066,779 B2 * | 6/2006 | Willinger | 446/188 |
| D526,029 S * | 8/2006 | Ragonetti et al. | D21/444 |
| 7,096,826 B2 | 8/2006 | Markham | |
| D536,396 S * | 2/2007 | Crane et al. | D21/444 |
| 2005/0034681 A1 | 2/2005 | Block | |
| 2005/0045115 A1 * | 3/2005 | Mann | 119/711 |
| 2005/0066911 A1 * | 3/2005 | Lubeck | 119/709 |
| 2005/0092258 A1 | 5/2005 | Markham | |

\* cited by examiner

WHIRLING WHEEL TOY

RELATED APPLICATIONS

This application is a non-provisional counterpart to and claims priority to U.S. Ser. No. 60/653,385, filed on Feb. 16, 2005, which is now expired, which is hereby fully incorporated by reference. The present application is a continuation of and claims priority to U.S. Ser. No. 29,236,653, now U.S. Pat. No. D526,029, filed on Aug. 19, 2005, issued Aug. 1, 2007, which is hereby fully incorporated by reference.

BACKGROUND OF THE INVENTION

1. Field of the Invention

The invention relates generally to pet amusement and exercise equipment and, more particularly, to aerodynamic toys employing a fascinator capable of attracting and generating interaction with a pet animal.

2. Discussion of the Prior Art

For dogs and other animal companions, toys are not a luxury, but a necessity. Toys help fight boredom in dogs left alone, and toys can even help prevent some problem behaviors from developing. Many factors contribute to the "right" toy, and a number of them depend upon dog's size, activity level, and preferences.

Many of a dog's toys should be interactive. Interactive play is very important for a dog because it needs active "people time"—and such play also enhances the bond between the pet owner and his pet. By focusing on a specific task—such as repeatedly returning a ball or toy or playing "hide-and-seek" with treats or toys—the dog can expel pent-up mental and physical energy in a limited amount of time and space. This greatly reduces stress due to confinement, isolation, and boredom. For young, high-energy, and untrained dogs, interactive play also offers an opportunity for socialization and helps them learn about appropriate and inappropriate behavior, such as jumping up or being mouthy.

The field of aerodynamic toys includes such well-known products as the Frisbee® flying disk, which is a saucer-shaped device that can be thrown over relatively long distances. To propel the Frisbee®, one grasps its edge while flexing the wrist, and then flings the disk by extending the wrist, thereby imparting spin to the disk and launching the disk through the air. A Frisbee® is capable of remaining aloft for a relatively long time given its peripheral mass distribution and its aerodynamic structure.

Other flying toys such as the aerial disk may, for example, include outer and inner concentric deformable boundary structures, with an airfoil web joining the structures. This toy deforms in flight to form a variety of shapes.

Still other flying toys may include a hollow disk which attains a shape similar to a "flying saucer". The spinning action of the toy causes the air scoops to direct air into the hollow regions of the toy. The shape of the toy and its aerodynamic characteristics are altered in flight and are also controlled by the method of throwing the toy.

The above-discussed toys represent only a small fraction of a variety of aerodynamic toys. Many of the toys combine a common Frisbee®-type disk with numerous toy features for added interest during play; for example, some of the aerodynamic toys feature parachuted figures, nested disks, remote-control ball drops, and illumination to the basic Frisbee®. However, none of the above-described references disclose a simple one-piece toy that combines the aerodynamic features of a disk-shaped throwable toy and the fullness of a ball or rounded toy, which can amuse a pet upon landing or simply generating a sound upon being compressed.

Accordingly, a need exists for a toy that offers at once the features of a disk-shaped aerodynamic toy and a ball operative to attract or amuse a pet.

A further need exists for the toy that permits a person to find enjoyment interacting with a pet.

Still a further need exists for the toy that combines aerodynamic, bouncing and sound characteristics that can amuse and attract the pet.

SUMMARY OF INVENTION

In accordance with the invention, a throwable toy is disclosed that combines the features of a disk-shaped flying toy with the features of a ball or rounded toy operative to produce sounds in response to applying a compression force. Specifically, the toy includes a disk-shaped portion circumscribed by a rounded rim and provided with a plurality of recesses. Two spherically shaped halves that protrude from opposite planes in an opposing fashion form the ball-like feature of the toy. Each of the halves is concentric to the circular rim of the toy, and at least one of the halves houses a fascinator operative to generate a sound in response to a compression force.

The present aerodynamic toy offers a unique play experience. It combines the ease of handling and aerodynamics experienced with a disk-shaped toy, a ball component, and a sound-generating fascinator or squeaker that invites a variety of pets to chase, catch and chew on the inventive toy. Thus, the present toy may be thrown in the known manner and kicked in the manner of a ball. Advantageously, the present toy lands in a substantially identical fashion each time it is thrown, given that each side of the ball component has a like-shaped protruding convexity. As such, one can expect perfect landings from the present toy with each throw or kick. In comparison, plain saucer-shaped flying toys may land upside-down.

The present toy may be made of any material that is sufficiently light in weight to allow an individual to throw it in the known manner. The toy may be made of a semi-rigid material such that it maintains its shape during play. The toy flexes upon impact but returns to its manufactured shape. The simplicity of its one-piece design allows for inexpensive manufacturing by known processes, such as injection molding.

The above and other features of the invention will become more readily apparent from the following detailed description accompanied by the following drawings.

DETAILED DESCRIPTION OF THE INVENTION

Figure 1:
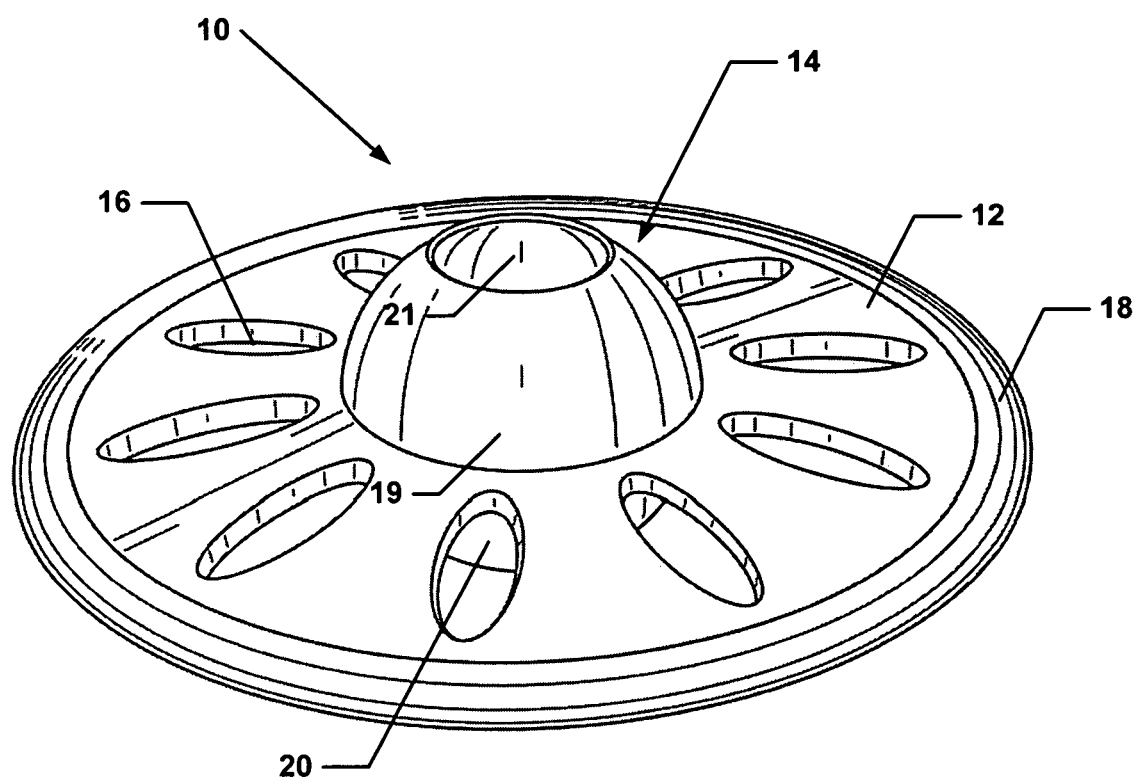
FIG. 1 is a perspective view of a preferred embodiment of the inventive toy in which the convexities protruding from the opposing planes of the circular disk are semi-spherical in shape.
Figure 2:
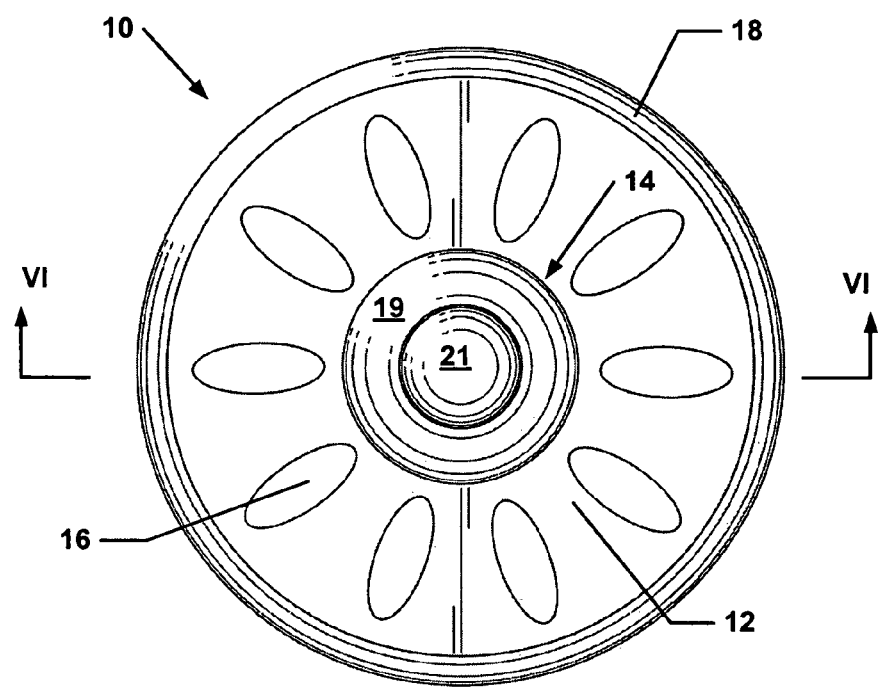
FIG. 2 is a top planar view of the inventive toy of FIG. 1.
Figure 3:
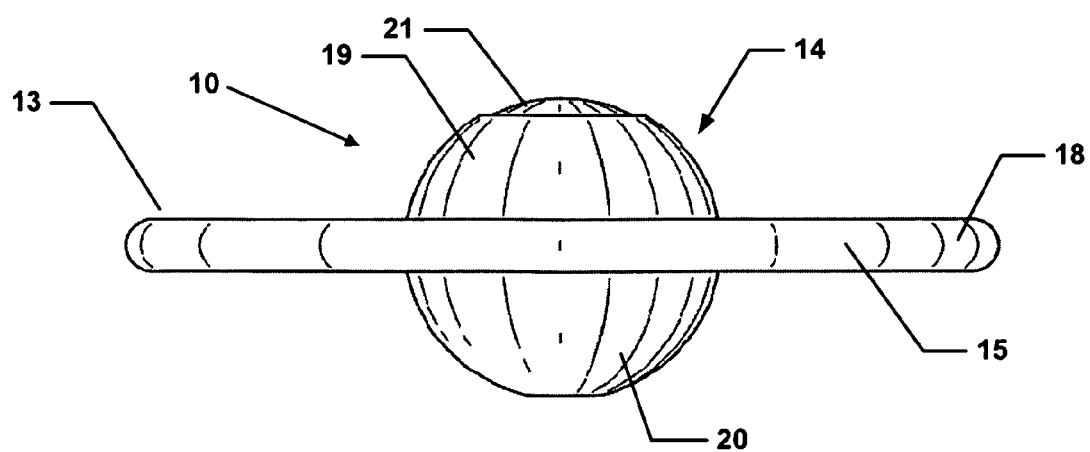
FIG. 3 is a side elevational view of inventive toy shown in FIG. 1.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, left, right, up, down, over, above, below, beneath, rear, and front may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices. Furthermore, such terms as "toy" and "whirling wheel toy" are used interchangeably.

In accordance with the invention, as depicted in FIGS. 1-6, a throwable and aerodynamic toy or whirling wheel toy 10 combines a disk 12 with a centrally positioned ball, rounded component, structure 14. Specifically, whirling wheel toy 10 comprises a one-piece molded device with flying disk 12 having a top side 13 and a bottom side 15 and circumscribed by a rounded rim 18. In a preferred configuration, rim 18 is formed with a greater thickness than the peripheral region of flying disk 12 and, thus, protrudes outwardly from opposite sides 13 and 15 of flying disk 12. Ball 14 includes a pair of top and bottom regions 19, 20, respectively, consisting of like-shaped protruding convexities or halves extending from top and bottom surfaces 13 and 15, respectively, of disk 12 in an opposing fashion. Both convexities are centered about an axis of symmetry at the center of disk 12 and substantially perpendicular to its top and bottom surfaces 13 and 15, respectively. In other words, the convexities are concentric to the disk.

When in flight, whirling wheel toy 10 has the appearance of a "flying saucer" or unidentified flying object, giving it added play appeal. The toy may be thrown in the manner of a Frisbee and, upon landing, may keep bouncing due to the resiliency of the ball's material. In play, whirling wheel toy 10 is thrown into the air with a spinning motion imparted thereto by grasping disk 12 with the fingers. More specifically, whirling wheel toy 10 is preferably grasped in one hand with the thumb carried on top of disk 12 and the four fingers pressing against the bottom of disk 12. The toy is then typically projected into the air in a wrist-snapping motion. Consequently, during an airborne flight, whirling wheel toy 10 rotates about its axis of symmetry. The angle at which disk 12 is held controls the particular flight trajectory assumed by whirling wheel toy 10. Typically, the inventive toy is propelled in an upwardly arching flight pattern so as to be held aloft aerodynamically for a time until assuming a downward trajectory toward the earth. If the trajectory of the toy's flight is correct, it typically lands on bottom half 20 of ball 14, bounces and generates a noise a few times giving a pet time to catch it in the air.

Turning now specifically to FIG. 1, whirling wheel toy 10 may be packaged individually to meet the individual needs of dogs classified in accordance with their respective size, which typically includes large, medium and small size dogs. In an alternative embodiment, however, more than one toy 10 can be packaged together so as to constitute a kit. One of the reasons for having the kit is that a pet may like one of the packaged toys and, for some reason, ignore the other one regardless of the size of toys 10. Whirling wheel toy 10 is preferably a single continuous unit, which is made from a moldable material selected from a substantially rigid material, such as plastic or foam, or a flexible material, such as rubber or plastic.

As is illustrated in the embodiment of FIGS. 1 through 6, top and bottom halves 19, 20 of ball 14, respectively, are semi-spherically-shaped halves. However, although not shown, the ball may have a shape differing from a round ball, such as crown 21 wherein it is advantageously shaped for better bounce and/or easier deformability, and be provided with two generally conically or frustoconicaly shaped opposite halves extending from the opposite sides of flying disk 12 so as to form a substantially elliptically-shaped body.

In accordance with one of the embodiments of the invention, both semi-spherical top and bottom halves 19, 20 of ball 14, respectively, are made from uniformly-densed polymeric material. However, in an alternative embodiment, half 20 protruding from bottom surface 15 of disk 12 may be made from a more dense material than the opposite half and, thus, be somewhat heavier. Configured in accordance with the latter embodiment, whirling wheel toy 10 may have a high probability of landing on the central region rather than wobble and land on rim 18 and, as a consequence, exhibit superior bouncing characteristics upon landing, which is particularly liked by dogs.

The disk 12 is of a substantially circular outline, and it may assume any appropriate diameter to be thrown by the pet owner. It may likewise assume any appropriate thickness defined between top surface 13 and bottom surface 15 of disk 12. In one embodiment of the invention, as shown in FIGS. 1 through 6, opposite top and bottom surfaces 13 and 15, respectively, extend in parallel planes. In an alternative embodiment, which is not shown, disk 12 may be extruded so as to have the top and bottom surfaces each having a respective convex shape cumulatively defining a substantially elliptical cross-section of the disk. In particular, the thickness of disk 12 defined between its top and bottom surfaces 13 and 15 may gradually increase towards the center of the disk reaching its maximum in a region that surrounds ball 14. In the latter embodiment, whirling wheel toy 10 may achieve high and long flight trajectories due to its better aerodynamic qualities. In any case, the thickness of disk 12 is selected so as to provide the pet owner with a comfortable grip.

Whirling wheel toy 10 may be either hollow or semi-solid, so long as surfaces 13 and 15 of disk 12 are substantially rigid to retain the shape of whirling wheel toy 10 during use and is sufficiently light in weight for throwing. Nonexclusive examples of substantially rigid materials that might form a solid whirling wheel toy 10 include foam, plastics, and rigid papers such as cardboard.

If a soft, flexible material, such as rubber, is employed to form whirling wheel toy 10, the latter would be semi-solid and the flexible material would have sufficient rigidity such that whirling wheel toy 10 substantially retains its shape during use.

In a semi-solid toy 10, the material, used to form toy 10, can have a controllably different density within disk 12. By carefully choosing the density of the material for various regions of disk 12, inventive whirling wheel toy 10 can have different flight characteristics. For example, if whirling wheel toy 10 having the capability of sustained flight is desired, the density of the material near rim 18 will be greater than the density of the material near ball 14.

The body of disk 12 may be continuous or provided with a plurality of spaced openings 16 extending between and through the disk's opposite top and bottom surfaces 13 and 15, respectively. It has been found that configuring and dimensioning whirling wheel toy 10 in a specific manner may enhance its aerodynamic characteristics.

Figure 4:
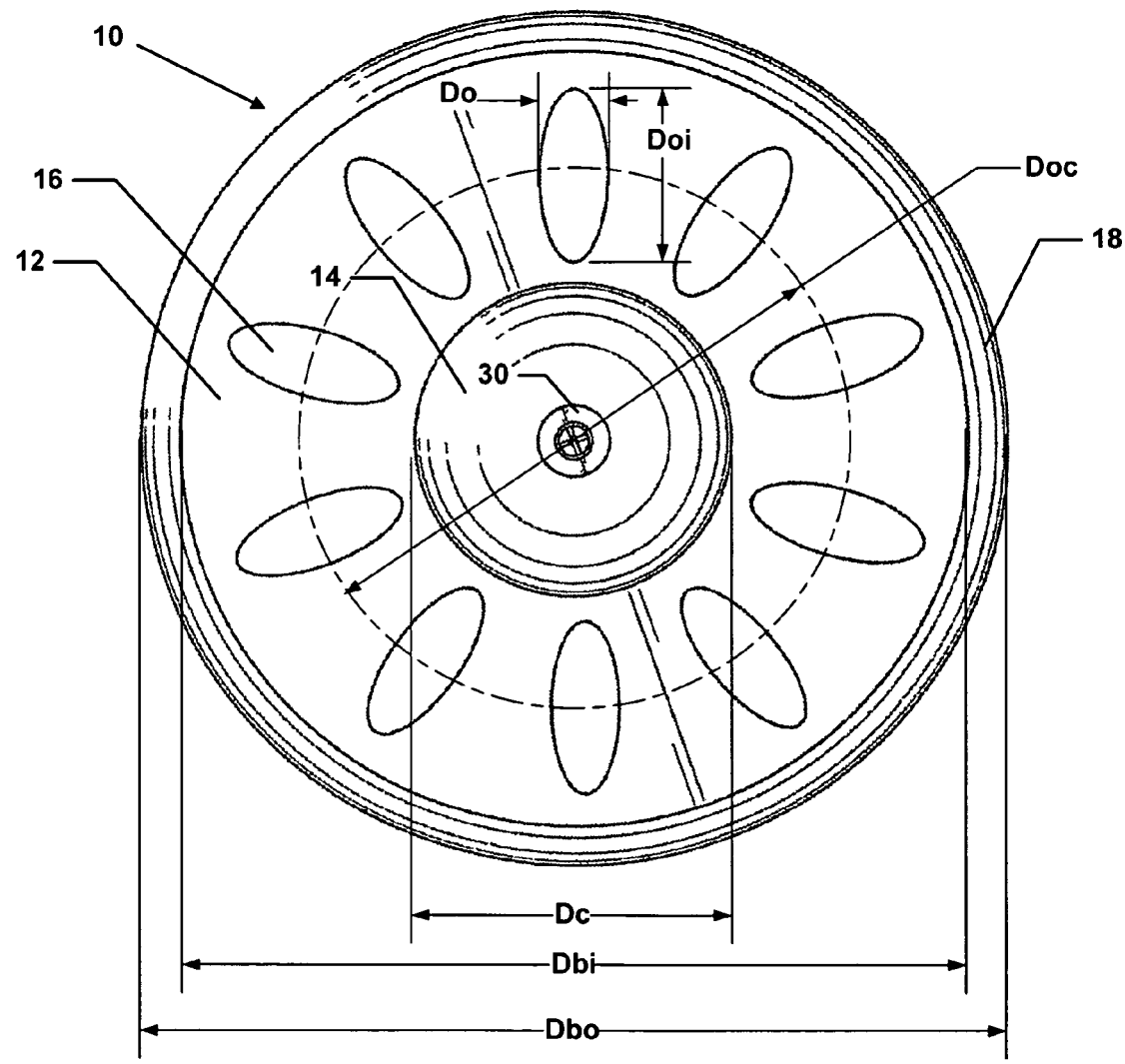
FIG. 4 is a bottom planar view of the inventive toy, as shown in FIG. 2.
Figure 5:
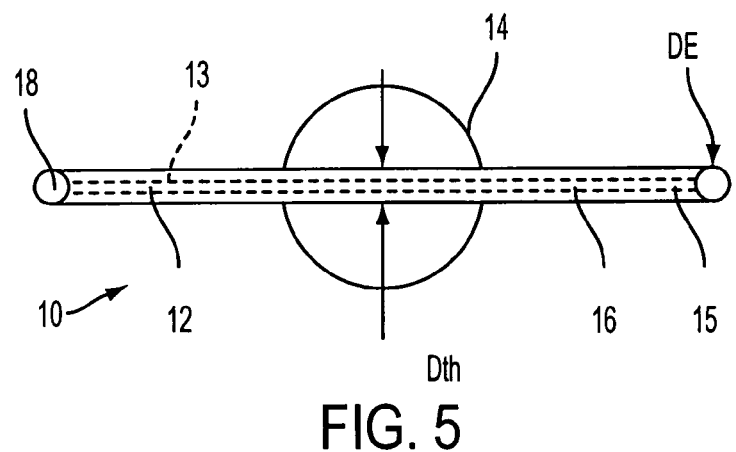
FIG. 5 is a diagrammatic side view of the inventive toy, as illustrated in FIG. 3.
Figure 6:
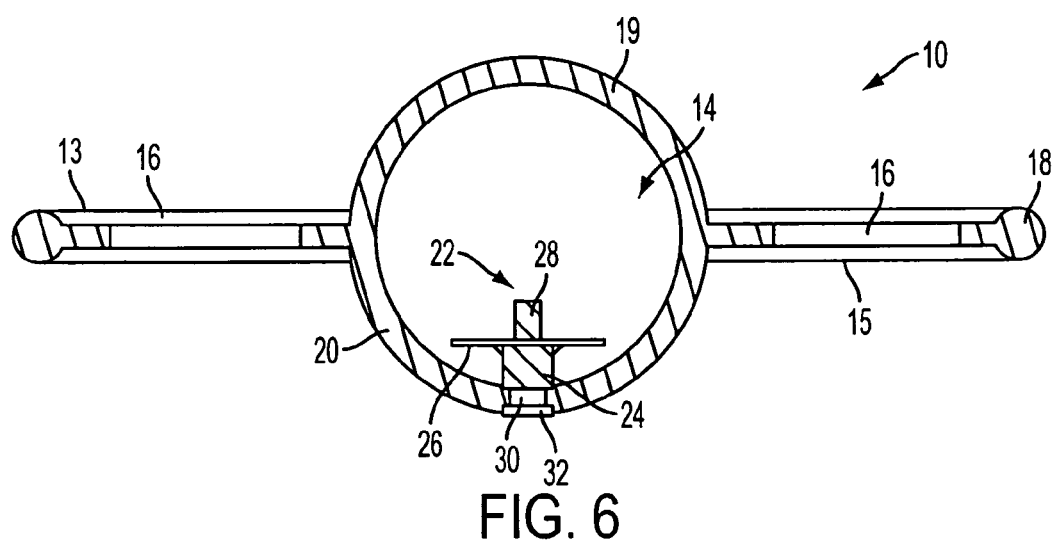
FIG. 6 is a cross sectional view of a preferred embodiment of the present toy in which the convexities protruding from the opposing planes of the circular disk region are semi-spherical in shape.

Turning to FIGS. 4 and 5, each of openings 16 is preferably provided with an oval shape and has a ratio of a length of its major axis, Dol, to a length of its minor axis Do of between about 2 to 3 in order to provide whirling wheel toy 10 with good aerodynamic characteristics. However, the oval shape is not the only shape that may be selected for openings 16. Other shapes, both regular and irregular, may be used as well. Empirically, it has been found that a ratio of about 2.3 to 2.7 between an inner diameter, Dbi, which is defined between opposite inner boundaries of rim 18, which has a diameter De, and an outer diameter Dc of ball 14 may also contribute to the improved aerodynamic characteristics of whirling wheel toy 10. Still a further feature beneficially affecting the aerodynamics of disk 12, which has a thickness Dth, includes selecting a ratio between the disk's outer diameter, Dbo, and outer diameter, Dc, of ball 14 of about 2.8 to 3.

An interesting feature of the inventive toy includes a fascinator such as squeaker 22 (FIG. 6) provided within bottom half 20 of ball 14 and operative to generate a noise upon impact with the ground. Since a material of ball 14 deforms upon impact and springs back to its original shape, the noise is produced each time bottom half 20 of ball 14 touches the ground. A configuration of squeaker 22 is known and includes an inner hollow portion 28, perforated plastic membrane 26, outer sleeve 24, inner sleeve 30 and outer flange 32 with an air intake port that lies flush with the outer surface of ball 14. Squeaker 22 is so positioned that air may be introduced into or expelled from the interior of ball 14 only through the squeaker. Upon collapsing or expanding of ball 14, the squeaker is traversed by air stream through the air intake port so as to produce a noise that usually attracts a pet, which either tries to catch the bouncing toy or simply chews on it. Hence, each time when the animal bites ball 14, or releases it, air passes through the squeaker producing a noise.

An optional feature is contemplated to be its illumination from within during play. Specifically, the toy 10 could be hollow and made of a translucent material, such as plastic or foam, and an illuminating means could be positioned internally in whirling wheel toy 10.

This document describes the inventive toy for illustration purposes only. Neither the specific embodiments of the invention as a whole, nor those of its features limit the general principles underlying the invention. In particular, the invention is not limited to any specific configuration of squeaker 22, shapes of ball 14 and rim 18. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention.

What is claimed is:

1. A whirling wheel toy for throwing and impacting, the whirling wheel toy comprising:
   a unitary structure comprising a hollow body, a web, and a rim;
   the hollow body for retaining ambient air, the hollow body being deformable upon impact and comprising an undeformed state prior to impact and deformed state upon impact, the deformed state comprising less ambient air than the undeformed state comprises ambient air;
   the web fixedly spacing the hollow body and from the rim;
   a squeaker mounted in the body, the squeaker responsive to ambient air being forced from the hollow body impacts;
   wherein the web comprises an aerodynamic shape to maintain the toy in a flight orientation so that the hollow body impacts before the rim and the web; and
   wherein the web comprises at least one opening.

2. The whirling wheel toy of claim 1 wherein the body, the rim, and the web comprise natural rubber.

3. The whirling wheel toy of claim 1, wherein the hollow body comprises a crown.

4. The whirling wheel toy of claim 1, wherein the web comprises a first maximal dimension Dbi and the hollow body comprises a second maximal dimension Dc, and wherein the ratio of the first and second dimensions is in a range of 2.3 to 2.7.

5. The whirling wheel toy of claim 1, wherein the rim comprises a first maximal diameter Dbo and the hollow body comprises a second maximal dimension Dc, and wherein the ratio of the first and second dimensions is in a range of 2.8 to 3.

6. The whirling wheel toy of claim 1, wherein the toy is symmetrical in a first and a second plane, the first and second planes being perpendicular to each other.

7. The whirling wheel toy of claim 1, wherein the web comprises a plurality of openings.

8. The whirling wheel toy of claim 1, wherein the at least one opening comprises a ratio of a major to a minor axis in a range of 2 to 3.

9. A whirling wheel toy for throwing and impacting, the whirling wheel toy comprising:
   a unitary body comprising a deformable structure and a web, the unitary body comprising an aerodynamic shape, the web comprising at least one opening;
   a sound producing device mounted in the deformable structure;
   the deformable structure comprising a first volume prior to impact and a second volume upon impact, the second volume being less than the first volume;
   wherein a volume difference between the first and second volume comprises ambient air,
   wherein the deformable structure forces the ambient air upon impact through the sound producing device to cause a sound.

10. The whirling wheel toy of claim 9, wherein the unitary body comprises a resilient material.

11. The whirling wheel toy of claim 9, wherein the web comprises a plurality of spaced-apart openings.

12. The whirling wheel toy of claim 9, wherein the unitary body comprises a rim peripheral to the web.

13. The whirling wheel toy of claim 12, wherein the rim comprises a first maximal diameter Dbo and the deformable structure comprises a second maximal dimension Dc, and wherein the ratio of the first and second dimensions is in a range of 2.8 to 3.

14. The whirling wheel toy of claim 9, wherein the web comprises a first maximal dimension Dbi and the deformable structure comprises a second maximal dimension Dc, and wherein the ratio of the first and second dimensions is in a range of 2.3 to 2.7.

15. A whirling wheel toy for throwing and impacting, the whirling wheel toy comprising:

a unitary structure comprising a hollow body, a web, and a rim;

the hollow body for retaining ambient air, the hollow body being deformable upon impact and comprising an undeformed state prior to impact and deformed state upon impact, the deformed state comprising less ambient air than the undeformed state comprises ambient air;

the web fixedly spacing the hollow body from the rim;

a squeaker mounted in the body, the squeaker responsive to ambient air being forced from the hollow body upon impact;

wherein the web comprises an aerodynamic shape to maintain the toy in a flight orientation so that the hollow body impacts before the rim and the web; and wherein the web comprises a first maximal dimension $D_{bi}$ and the hollow body comprises a second maximal dimension $D_c$, and wherein the ratio of the first and second dimensions is in a range of 2.3 to 2.7.

16. The whirling wheel toy of claim 15 wherein the body, the rim, and the web comprise natural rubber.

17. The whirling wheel toy of claim 15, wherein the hollow body comprises a crown.

18. The whirling wheel toy of claim 15, wherein the rim comprises a first maximal diameter $D_{bo}$ and the hollow body comprises a second maximal dimension $D_c$, and wherein the ratio of the first and second dimensions is in a range of 2.8 to 3.

19. The whirling wheel toy of claim 15, wherein the toy is symmetrical in a first and a second plane, the first and second planes being perpendicular to each other.

20. The whirling wheel toy of claim 15, wherein the web comprises at least one opening having a ratio of a major to a minor axis in a range of 2 to 3.

* * * * *

UNITED STATES PATENT AND TRADEMARK OFFICE
CERTIFICATE OF CORRECTION

PATENT NO.        : 7,513,220 B2                                              Page 1 of 1
APPLICATION NO. : 11/356312
DATED             : April 7, 2009
INVENTOR(S)       : Peter T. Ragonetti et al.

It is certified that error appears in the above-identified patent and that said Letters Patent is hereby corrected as shown below:

Column 6, line 6: "the web fixedly spacing the hollow body and from the rim;" should be changed to --the web fixedly spacing the hollow body from the rim;--.

Signed and Sealed this

Twenty-sixth Day of May, 2009

JOHN DOLL
*Acting Director of the United States Patent and Trademark Office*